Jan. 18, 1927.  
W. S. EVANS  
1,615,170  
CROWN AND TRAVELING BLOCK PULLEY  
Filed Dec. 29, 1925     2 Sheets-Sheet 2
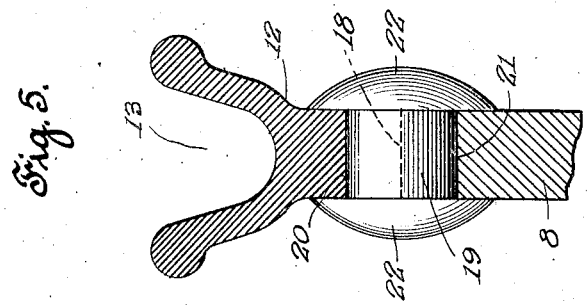
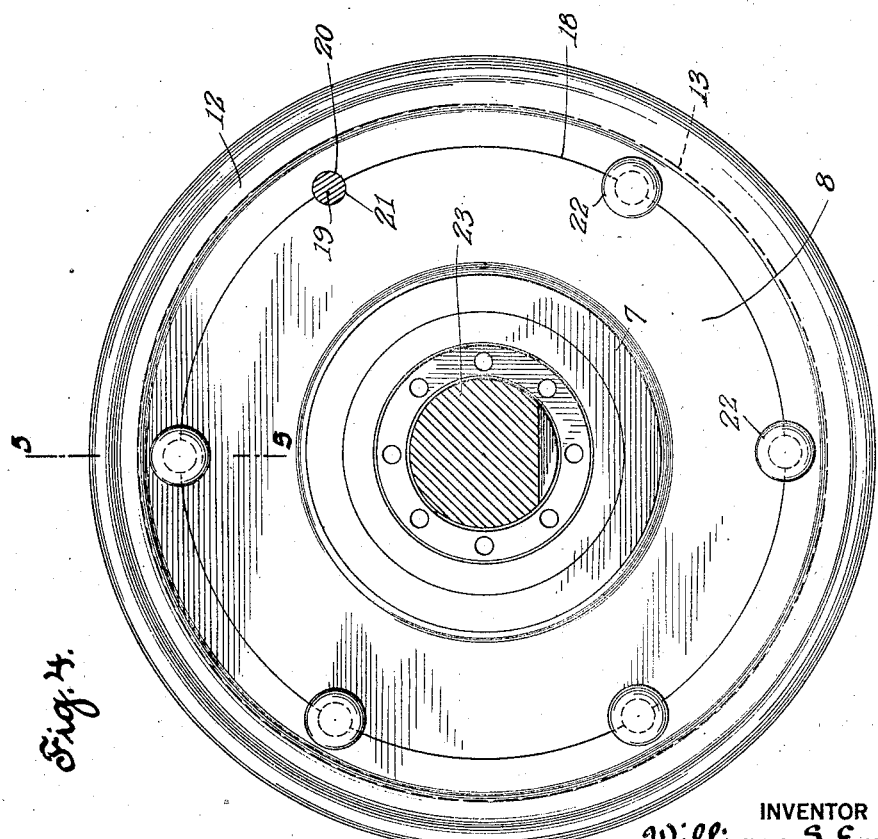
INVENTOR  
William S. Evans  
BY  
ATTORNEY Patented Jan. 18, 1927.

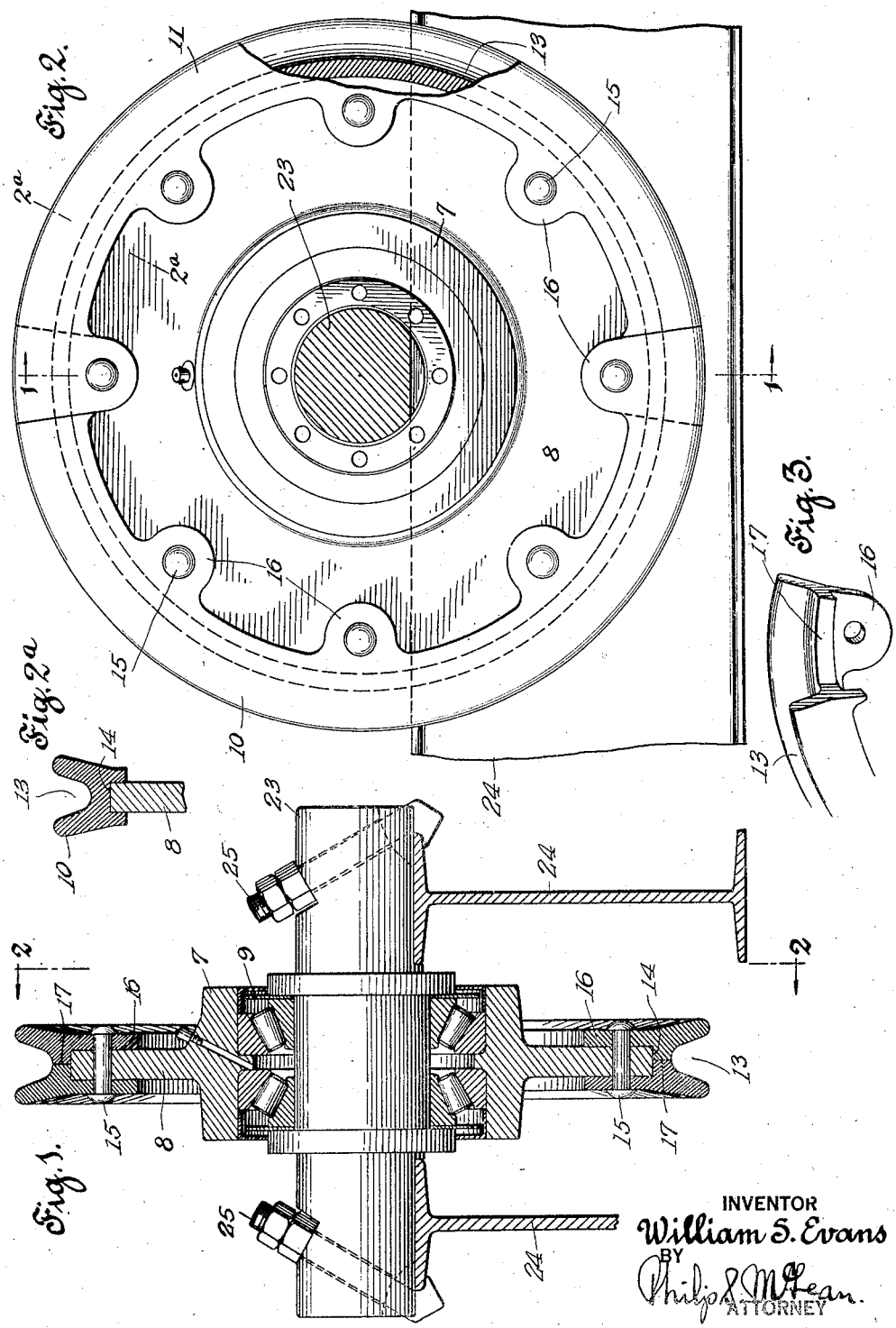

1,615,170

UNITED STATES PATENT OFFICE.

WILLIAM S. EVANS, OF MORSEMERE, NEW JERSEY.

CROWN AND TRAVELING BLOCK PULLEY.

Application filed December 29, 1925. Serial No. 78,153.

This invention relates particularly to the heavy crown block and traveling block pulleys used in the oil fields. The sheaves of these blocks are subjected to unusually severe wear because of the sand and grit carried by the cables. Usually these pulley sheaves are made of cast iron and as they must run freely to carry the cable at high speed, it is customary to mount them with special anti-friction roller bearings. The abrasive action of the wire rope rapidly wears away the rims of these sheaves, rendering them useless long before the roller bearings are worn out and as these bearings are necessarily rather expensive, the loss thus occasioned by the wearing of the rims is considerable.

It has been proposed to construct these pulleys of a harder and better wearing material, such for instance as manganese steel, but this is prohibitive because of the cost of the material and the expense of manufacture, the metal being so hard that it cannot be machined and has to be ground to shape.

It has also been proposed to line the groove of a chain drive sheave with a shell of manganese steel keyed in place by interfitting projections and seats in the liner and pulley groove and provided with projecting lugs for driving the chain. This driving sheave structure, however, is not applicable to the present problem because the conditions in a free running pulley are reversed, the sheave being the driven element and serving as a free running support instead of a power transmitting member. This groove liner structure is also impracticable for oil field service because of the excessive weights the pulleys must be capable of carrying.

The present invention aims to provide a practical solution of the problems stated and further, to provide a pulley sheave for crown blocks, traveling blocks and the like, capable of carrying a heavy running load and withstanding abrasive and other destructive forces and which, furthermore, will be entirely practical from both the manufacturing and the costs standpoints.

These objects are attained by certain novel features of construction, combinations and relations of parts as hereinafter set forth and broadly claimed.

The drawings accompanying and forming part of this specification illustrate the invention embodied in two of its present commercial forms.

Figure 1 is a vertical sectional view of a form of the new sheave as mounted in a crown block, this view being taken as on substantially the plane of line 1—1 of Figure 2.

Figure 2 is a side elevation and part sectional view of the sheave as taken on substantially the plane of line 2—2 of Figure 1.

Figure 2$^a$ is a broken detail section as on substantially the plane of line 2$^a$—2$^a$ of Figure 2.

Figure 3 is a broken detail of the scarfed end of one of the rim segments.

Figure 4 is a side elevation of a form of the invention in which the rim is made as a single continuous piece instead of in segments, as in the first form.

Figure 5 is an enlarged cross sectional detail as on line 5—5 of Figure 4.

The center or hub portion of the pulley consists of a sleeve or hub structure 7 carrying an outstanding annular web or flange 8. This forms the "core" or weight carrying portion of the pulley and may be made of cast iron which is relatively inexpensive and can be readily machined to take the tapered roll or other anti-friction bearings 9.

The rim of the pulley consists of a ring of harder, long wearing material, such as manganese steel. This ring may be made in segments as shown at 10, 11 in Figures 1 to 3 or be made as a single complete annulus as indicated at 12 in Figures 4 and 5, it being in each case grooved on its exterior at 13 to receive the cable and shaped interiorly to seat on the outstanding web of the hub.

In the first embodiment shown, the engagement of the rim with the web is effected by grooving the rim segments at 14 to fit closely over and about the edge of the web and by fastening bolts or rivets 15 through radially or inwardly extending perforated lugs 16 and the intervening portions of the web embraced thereby.

To provide smooth joints at the meeting ends of the segments these ends may be scarfed as indicated at 17, the half-width sections thus formed at the ends of the segments overlapping as indicated particularly in Figure 2 and each carrying one of the anchorage lugs 16 so that a single securing bolt or rivet at each joint serves both to fasten the segments together in overlapping order and to anchor the ends of the segments to the web of the pulley. The end lugs 16 of each rim segment are disposed at opposite sides of the center line so as to match the correspondingly alternately arranged lugs of a companion segment, which latter may be in all essential respects an exact duplicate of the same. The segments are thus all of the same pattern which is an important advantage from manufacturing, assembling and other standpoints.

When made as a single continuous one piece ring as in Figures 4 and 5, the inside of the rim, instead of being grooved as in the first instance, may be made with a relatively short annular web 18 engaging about and having a tight fit over the web of the hub. The rim is fixedly secured in this relation by fastenings 19 extended through registering notches 20, 21, formed in opposing portions of the web of the rim and the web of the hub respectively, said fastenings being illustrated as relatively heavy rivets having broad heads 22 overlying the faces of the two webs to hold them securely alined as indicated in Figure 5. The assembly and securing of this form of rim on the pulley center is thus also a relatively simple matter. Also, once fastened, the parts are securely held and interlocked in a rigid unitary structure. In case of need, however, the fastenings may be driven out and the rim segments or the complete rim, as the case may be, be removed from the pulley center and be replaced by a new or different rim.

The pulley center consisting of but the hub and outstanding flange, is relatively inexpensive, strong and because of its simpler structure can be readily and inexpensively manufactured to accurate size for close fit with the rim. The rim also, whether it be in the segmental or in the continuous ring form is free of any manufacturing complications and is particularly strong and, strength considered, requires but a minimum of the expensive, harder metal in its make-up. In both forms a minimum of grinding and fitting is required, practically the only work of this character necessary being to shape the cable groove in the outside of the rim and the groove or the flat side, as the case may be at the inside of the rim for engagement with the web of the hub.

The groove in the rim is shaped to take the cable with the least possible friction and is brought to a smooth finish. This results in reduced wear on the cable. Because of the greater strength in the harder metal rim, the pulley sheaves can be made considerably lighter in weight than those now in use.

In the crown block installation shown in Figures 1 and 2, the roller bearings 9 which carry the sheave are mounted on a supporting shaft 23 shown as secured on the crown block beams 24 by hook bolts 25. The form of mounting, however, naturally will vary with the particular adaptation of the invention and changes may be made in the special structure of the rim and its mounting on the pulley center, coming within the scope of the appended claims.

What is claimed is:

1. A pulley for crown blocks, traveling blocks and the like comprising a sheave hub having a plain outstanding ungrooved circular web, a grooved rim of hard wear resisting metal having a circular inner surface to fit the plain edge of the web and fastening means for securing the rim against lateral displacement on the edge of the web, the rim being interrupted and having its ends scarfed and joined in overlapping relation with fastening lugs on the overlapping portions of such ends extending radially inwardly over the sides of the web and a fastening stud extending through said lugs.

2. A pulley for crown blocks, traveling blocks and the like comprising a sheave hub having a plain outstanding ungrooved circular web, a grooved rim of hard wear resisting metal having a circular inner surface to fit the plain edge of the web and fastening means for securing the rim against lateral displacement on the edge of the web, including headed studs, the rim having a narrow inner web resting on the hub web and the two webs having complementary notches receiving the studs, the heads of the studs overlapping adjacent portions of the two webs, whereby the parts are interlocked against lateral and rotative displacement.

3. A free running pulley for crown blocks, traveling blocks and the like comprising a relatively fixed supporting shaft, a sheave hub journaled to rotate freely thereon and provided with an outstanding substantially circular web, a rim of hard long wearing metal having a continuously smooth and unobstructed cable receiving groove, said rim having its inner surface finished to fit the web of the hub, said web and rim having overlapping portions consisting of spaced flanges on one embracing a web portion of the other and fastenings extending through said relatively overlapping flanges and the web portion embraced thereby, said rim consisting of duplicate segments having reversely scarfed ends secured in overlapping relation by the fastenings aforesaid.

In witness whereof, I have hereunto set my hand this 28th day of December, 1925.

WILLIAM S. EVANS.